United States Patent [19]

Anderson

[11] 4,446,652
[45] May 8, 1984

[54] UNITARY FLOWER POT

[75] Inventor: Dennis C. Anderson, Northfield, Minn.

[73] Assignee: National Polymers, Inc., Lakeville, Minn.

[21] Appl. No.: 425,971

[22] Filed: Sep. 28, 1982

[51] Int. Cl.³ .............................................. A01G 9/02
[52] U.S. Cl. ............................................ 47/66; 47/67
[58] Field of Search .............. 47/66, 67, 70, 71, 79–81

[56] References Cited

U.S. PATENT DOCUMENTS

| | | | |
|---|---|---|---|
| 1,297,484 | 3/1919 | Lutey | 47/71 |
| 1,601,259 | 9/1926 | Pettigrew | 47/79 |
| 2,807,912 | 10/1957 | Bjorksten | 47/79 X |
| 3,168,797 | 2/1965 | Patassy | 47/79 |
| 3,576,088 | 4/1971 | Arca | 47/81 |
| 3,783,555 | 1/1974 | Peters | 47/79 |
| 3,800,471 | 4/1974 | Adams | 47/79 |
| 3,903,644 | 9/1975 | Swift et al. | 47/79 |
| 3,975,860 | 8/1976 | Harned et al. | 47/81 |
| 3,986,299 | 10/1976 | Merzweiler | 47/73 |
| 4,183,175 | 1/1980 | Magee | 47/79 |
| 4,189,867 | 2/1980 | Schneck | 47/62 |
| 4,198,784 | 4/1980 | Sukert | 47/79 |
| 4,216,622 | 8/1980 | Hollenbach et al. | 47/71 |
| 4,392,327 | 7/1983 | Sanders | 47/81 X |

FOREIGN PATENT DOCUMENTS

| | | | |
|---|---|---|---|
| 2935568 | 3/1981 | Fed. Rep. of Germany | 47/79 |
| 2250469 | 7/1975 | France | 47/81 |
| 1147851 | 4/1969 | United Kingdom | 47/81 |

*Primary Examiner*—James R. Feyrer
*Attorney, Agent, or Firm*—James V. Harmon

[57] ABSTRACT

A unitary, i.e., one-piece, flower pot is described having a water reservoir at the bottom thereof defined by a bottom wall and a soil support plate positioned above the bottom wall and being hinged to the pot along a hinge line located above the bottom wall. The soil support plate is hinged to the pot by means of the plastic resin from which the pot is formed. Through this means, the soil support plate and pot are all formed integrally from the same material with the support plate at a vertical position in alignment with the axis of the pot so that it can be removed from the mold and then swung downwardly about the hinge to a horizontal position when soil is to be placed in the pot.

9 Claims, 6 Drawing Figures

U.S. Patent      May 8, 1984      4,446,652
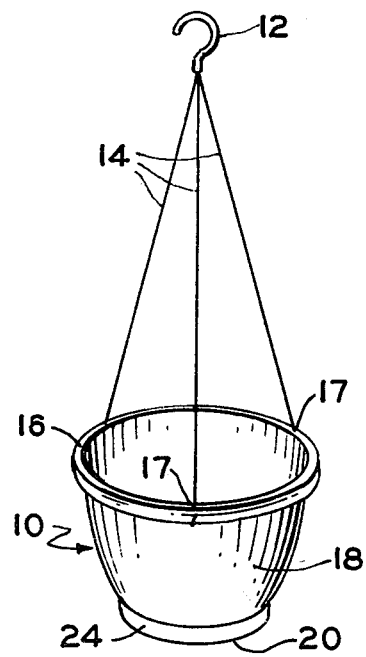
FIG. 1
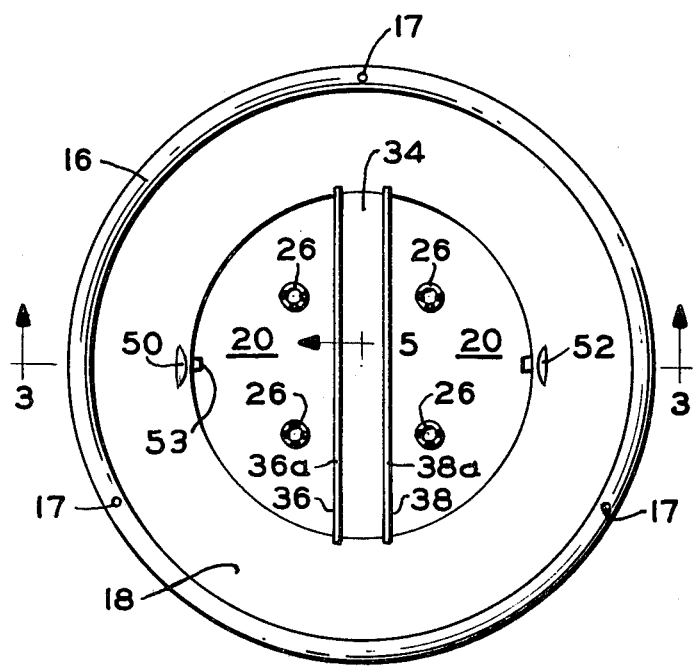
FIG. 2
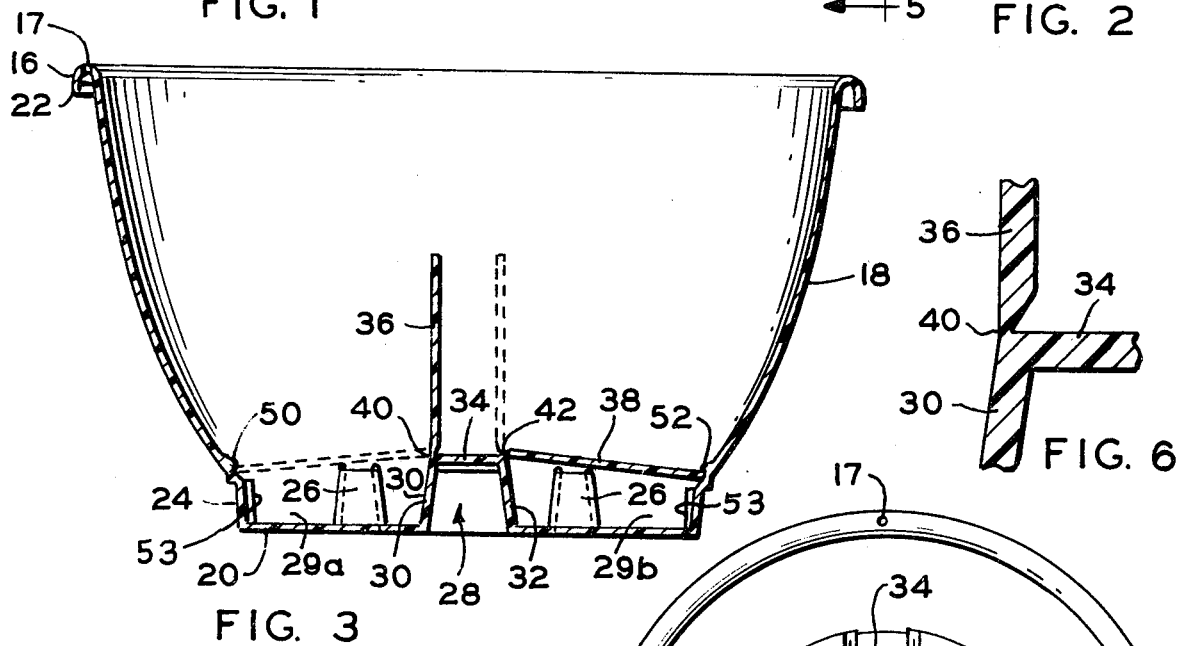
FIG. 3
FIG. 6
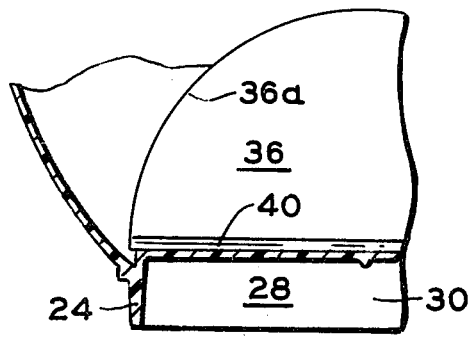
FIG. 5
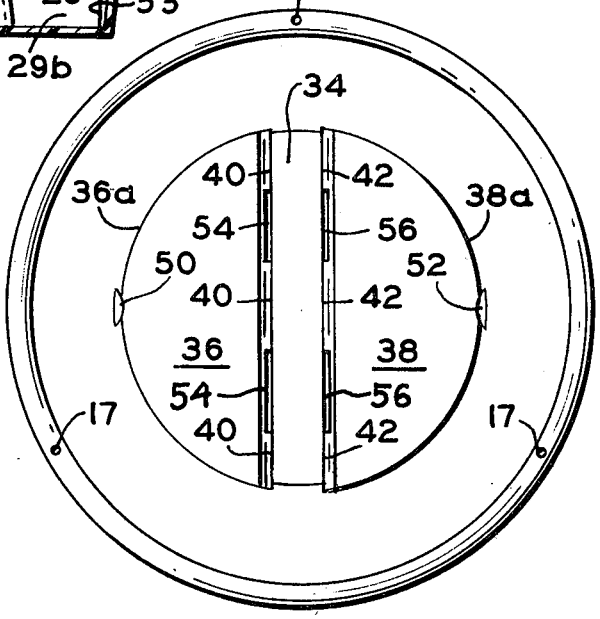
FIG. 4

UNITARY FLOWER POT

FIELD OF THE INVENTION

The present invention relates to pots for growing plants and more particularly to a unitary flower pot having a water storage reservoir below the soil contained therein.

THE PRIOR ART

In recent year, plastic flower pots have gained more and more acceptance and have replaced the old-fashioned clay pots for many applications. One of the most popular plastic flower pots used by growers is one particularly well adapted for use either as a hanging basket or for use resting on a table or other horizontal surface. It includes side and bottom walls as well as a saucer or tray that is provided as a separate piece. The saucer catches any overflow of water that drains from the bottom of the pot to prevent it from spilling. While such pots are generally suitable, they have a number of disadvantages. First, the saucer may become misplaced or lost. This problem usually results from the desire on the part of the growers to begin the plant without the saucer attached to make sure growth can take place without the roots being immersed in water which is, of course, undesirable. In addition, assembling the saucers and pots is time consuming and the handling of two separate parts not only adds to the cost of the product but also requires more time and effort.

An important requirement for maintaining optimum growth conditions for growing plants is the necessity of preventing the roots from being submerged continuously in water. While this condition interferes with efficient growth of the plant, it is nevertheless desirable to catch excess water placed on the plant at the time of watering to prevent it from flowing onto the floor or elsewhere. Obviously, a pot with a single compartment containing a homogeneous soil cannot perform both of these objectives unless an external saucer or tray is provided for catching the overflow. Thus, one major object of the present invention is the provision of a unitary pot with a means for catching the overflow of water but which at the same time will support the soil above the level of the water in the reservoir thereby preventing drowning of the roots. Such a pot should be moldable from any suitable plastic resin using known molding techniques and must be constructed so as to easily and quickly separate from the molding dies as well as being easily placed in condition for use. In overcoming the deficiencies of the prior art, it is thus desirable to eliminate the saucer entirely in a one-piece pot without eliminating its function.

SUMMARY OF THE INVENTION

In accordance with the present invention, a unitary flower pot is provided, i.e., formed from one piece, which includes a flower pot body with a side wall extending upwardly and having a rim at its upper edge defining an open mouth. At the lower edge of the side wall is a horizontal bottom wall which closes the lower aspect of the pot. At least one swinging soil support plate is hinged to the pot along a hinge line at an elevation above the bottom wall. The hinge is horizontally disposed and comprises a living hinge connected between the swinging plate and the body of the pot. The term "living hinge" as used herein designates a hinge formed from resinous plastic material and being integral with the plastic resinous elements on either side thereof, in this case the pot body and the swinging plate. The pot is formed from a suitable plastic resin and is moldable with the plate in a vertical position aligned with the vertical axis of the pot itself. Just prior to use, the plate is adapted to be folded at the hinge to a horizontal position spaced above the bottom wall and parallel to it to define a water reservoir between itself and the bottom wall of the pot. The pot preferably has a means for supporting the plate in the horizontal position to resist the weight of the soil in the pot and the reservoir is preferably provided with at least one drain opening therein above the bottom wall to allow excess water to drain off.

THE FIGURES

FIG. 1 is a perspective view of the invention during use before soil is introduced.

FIG. 2 is a top view of the pot of FIG. 1 on an enlarged scale as it appears after being withdrawn from the plastic injection molding die.

FIG. 3 is a transverse sectional view taken on line 3—3 of FIG. 2.

FIG. 4 is a top view of the invention similar to FIG. 2 with the soil support plates locked in their horizontal positions just prior to the introduction of soil.

FIG. 5 is a partial vertical sectional view taken on line 5—5 of FIG. 2.

FIG. 6 is a greatly enlarged partial crossectional view taken through the hinge of the soil support plate and associated structure.

DESCRIPTION OF THE PREFERRED EMBODIMENT

Refer to the figures and particularly to FIG. 1.

Shown in FIG. 1 is a pot in accordance with the invention designated by numeral 10. The pot 10 is supported when it is used as a hanging basket from a hook 12 connected to it by means of three support wires or other connecting members such as chains, cables or the like. The lower ends of the wires 14 are connected to the pot at rim 16 by the proivision of openings 17 within the rim. It is convenient to bend the lower ends of the wires upwardly after passing them through the holes 17. The pot 10 includes an upwardly extending side wall 18 which in this case is circular as seen in crossection. It curves centrally toward its lower end so that the pot has the shape of an inverted dome. The side wall terminates at its upper edge in the outwardly and downwardly turned circular rim 16 to define an open mouth at the top of the pot. At the lower end of the side wall is a horizontally extending bottom wall 20. If desired, a downwardly extending circular sleeve 24 of cylindrical configuration can be provided between the curved portion of the side wall 18 and the bottom wall 20. This provision is, however, made for esthetic reasons and is not essential to the operation of the invention. In other words, the contoured dome-shaped side wall 18 could contiue if desired to the bottom wall 20. In this instance, the bottom wall 20 is divided into two segments or portions which are separated from one another as will be described more fully below. The two side-by-side portions of the bottom wall 20 can be best seen in FIGS. 2 and 3.

In each portion of the bottom wall 20 is provided drain openings or overflow tubes 26. As best shown in FIGS. 1 and 2, the tubes 26 are open at both the top and bottom and are integral with the bottom wall 20 at their lower edges. The overflow tubes 26 serve as a means to drain off excess water as will be described below. At the top of each of the drain tubes is provided a means such as a plurality of vertical projections to prevent the top of the drain tubes from becoming sealed. These projections can comprise radially spaced apart vertically extending knobs or the like located on the top edge of each of the tubes. These knobs will prevent the soil support plate to be described below from sealing off the upper edge of the tubes 26 during use. The tubes 26 help at times to support plates 36 and 38.

Between the bottom wall segments 20 is a horizontally disposed transversely extending beam or channel 28 having the shape of an inverted "U" as seen in crosssection. The channel 28 includes left and right laterally spaced apart parallel transversely extending side walls 30 and 32 and a horizontally disclosed connecting top wall 34. To the side edges of the top wall 34 are hinged a pair of initially vertically extending soil support plates 36 and 38. The support plates 36 and 38 are connected to the pot via the channel 30 by means of living hinges 40 and 42 which in this case are parallel to one another and extend transversely of the pot along the upper edge of each of the side walls 30 and 32 of the channel 28. The term "living hinge" as used herein means a hinge integral with the pot and formed from the same material from which the pot is composed, i.e., the same material as the adjacent structure.

The hinges 40, 42 are not continuous but are interrupted by the provision of four drain openings two of which designated 54 are located in the hinge 40 and two of which designated 56 are located in the hinge 42. These drain openings 54-56 allow water to drain from the soil after watering into the chambers on either side of the channel 28 above the bottom wall segments 20.

The soil support plates 36 are flat or substantially flat plates having a thickness of a fraction of an inch, typically about 1/16" in thickness. Each plate 36-38 has a straight horizontally disposed edge at its respective hinge 40-42 and a circular edge 36a or 38a.

Molded into the inner surface of the side wall 18 of the pot are a pair of diametrically opposed catches 50-52 for holding the support plates 36-38 in place just prior to the introduction of the soil. Thus, during molding, the plates are in a vertical position shown in FIG. 2 but before use they are folded downwardly about hinges 40-42 until the edges 36a,38a snap under the catches 50, 52 respectively. The pot is now ready for use. It can be seen that supporting stops 53 consisting of bar-shaped extensions projecting radially inward from the inner surface of the cylindrical sleeve 24 prevent excessive downward deflection of the free edge of the soil support plates 36, 38. They are particularly helpful when the soil is heavy or saturated with moisture.

As thus seen in FIG. 3, the channel 28 divides the lower portion of the pot into two chambers or reservoirs 29a and 29b. These chambers are generally half-moon shaped as seen from above. They are positioned in side-by-side laterally spaced apart relationship and each accumulates excess or overflow water that seeps down through the drain openings 54-56 and around the free edges 36a-38a of the support plate.

The pot can be molded in various ways but the most satisfactory method is to use a mold with a movable center block that is located between the plates in their vertical or upright position of FIG. 2 during molding and immediately after the molding operation lifts the pot off the male part of the mold. While the movable center block is still engaged between the plates 36–38 and is in its extended position, a second ejection means in the form of an ejection pin extends through the center block to strip the part from the movable center block. Other molding methods will suggest themselves to those skilled in the art.

As can be seen from the description provided, excess water will be allowed to run off and can be stored without the use of a saucer or tray that may become lost. Moreover, the runoff water is stored in a storage reservoir 29a-29b without soil or roots present. Excess water in the reservoir will drain out through the tubes 26.

The pot is easily placed in condition for use. All that is necessary is to bend the plates 36–38 downwardly about hinges 40–42 and snap the free edges under the catches 50, 52. The channel or beam 28 establishes the height of the soil support plates and serves as a support for the hinges 40, 42. It also strengthens the pot.

A variety of modifications may be made. For example, the pot may have a crossectional configuration other than round and the catches 50, 52 can be indentations with corresponding projections provided along the periphery or margin of the plates that will snap into them. While drain tubes 26 have been shown, it is apparent that other forms of drain means could be provided such as openings near the top edge of the cylindrical sleeve 24. The small extensions that project up from the top of the tubes reliably prevent the tubes from being sealed by the downward deflection of the plates 36-38 when heavily loaded with soil. Other discontinuities, notches or the like could be provided in the upper ends of the tubes 26 to serve as a means for preventing their ends from being sealed by the plates.

Other variations in the invention will be apparent to those skilled in the art within the scope of the appended claims once the principles disclosed are understood.

What is claimed is:

1. A unitary flower pot including a flower pot body having a side wall and an upper free edge defining an upper open mouth, a horizontal bottom wall at the lower edge of the side wall closing the lower aspect of the pot, at least one swinging soil support plate hinged to the pot and said plate having an elevation above the bottom wall to define a water storage reservoir therebetween, a horizontally disposed living hinge connection between the plate and the body of the pot, said pot being formed from moldable plastic resin and being formed with said plate in a substantially vertical position, said plate being connected to be folded at the hinge to a horizontal position spaced above the bottom wall and parallel thereto to define said water reservoir between them, said pot having a means to support the plate in said horizontal position and to resist the weight of the soil in the pot and said reservoir having at least one drain opening therein above the bottom wall to allow excess water to drain off.

2. The pot of claim 1 wherein two laterally spaced apart initially substantially parallel plates are provided and each is connected to the pot by one such hinge, each such hinge being parallel to the other and being spaced apart laterally from the other.

3. The pot of claim 2 wherein a horizontally disposed channel is provided at the lower aspect of the pot, said channel including a pair of transversely extending laterally spaced apart side walls and the horizontally disposed connecting wall at the upper edges of each of the side walls and said hinges are each provided at the upper edge of each of the side walls of the channel, said channel having a crossectional configuration of an inverted "U" whereby the reservoir comprises a pair of reservoirs, one on either side of the channel and above the bottom wall of the pot.

4. The pot of claim 1 wherein the hinge is divided into segments by the provision of at least one drain opening therein, said drain opening communicating between the interior of the pot above the plate and said water storage reservoir between the plate and the bottom wall of the pot.

5. The pot of claim 1 wherein a catch means is provided in the interior surface of the side wall of the pot for retaining the soil support plate in horizontal position.

6. The pot of claim 1 wherein support means is provided for preventing excessive downward deflection of the soil support plate at its free end to resist the downward pressure of the soil within the pot.

7. The flower pot of claim 1 wherein the reservoir includes a stand pipe drain opening means located at a level above the bottom wall to prevent excessive moisture accumulation therein.

8. The pot of claim 7 wherein the overflow stand pipe drain means comprises at least one drain tube open at its upper and lower ends and integral with the bottom wall at its lower end.

9. The pot of claim 8 wherein the stand pipe drain tube has discontinuities at its upper end to prevent downward deflection of the soil support plate from sealing the upper end thereof.

* * * * *